H. E. DEY.
APPARATUS FOR CONTROLLING ELECTRIC MOTORS.
APPLICATION FILED AUG. 8, 1908.
942,197.
Patented Dec. 7, 1909.
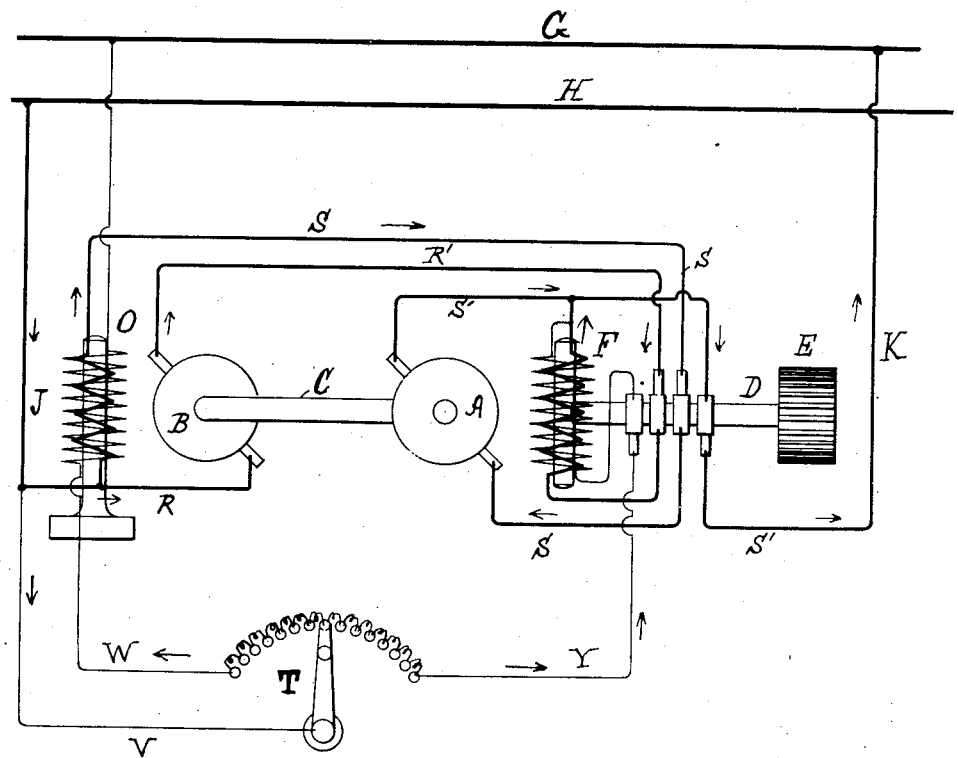

UNITED STATES PATENT OFFICE.

HARRY E. DEY, OF JERSEY CITY, NEW JERSEY, ASSIGNOR TO BEN T. CABLE, OF NEW YORK, N. Y.

APPARATUS FOR CONTROLLING ELECTRIC MOTORS.

942,197. Specification of Letters Patent. Patented Dec. 7, 1909.

Application filed August 8, 1908. Serial No. 447,570.

*To all whom it may concern:*

Be it known that I, HARRY E. DEY, a citizen of the United States, and a resident of Jersey City, in the county of Hudson and State of New Jersey, have invented certain new and useful Improvements in Apparatus for Controlling Electric Motors, of which the following is a specification.

My invention relates to that class of apparatus for controlling electric motors in which the speed of the load is controlled by a differential electrical effect on the two dynamo-electric machines through which power is derived. In such apparatus it is usual to have the field of one machine stationary while the field of the other is rotary so as to carry the load. In this case both armatures revolve and are mechanically connected so as to revolve in unison. As is well known the speed and direction of movement of the load depends upon the difference in speed of the two dynamo-electric machines. The speed of the machine with the stationary field is, of course, only the speed of the armature. The speed of the machine with the rotary field, is however, the difference between the speed of the armature and the speed of the rotary field. As of course, the speed of both armatures is the same, this difference is relative to the armature speed and is either positive or negative according to whether the relative speed of the rotary field pair is greater or less than the armature shaft. Each machine may act as a motor or as a dynamo; the armature requiring a greater current to act as a motor than as a dynamo when the load is positive and the control of the two machines is brought about by controlling the dynamo field and the motor field by varying their relative strength. This is done by placing what may be called a normal amount of resistance in each field circuit and by varying these normal amounts relatively to each other by cutting out resistance from one circuit and throwing resistance into the other circuit. Ordinarily the varying speed caused by the fluctuating load has been automatically governed by the well known method of compound winding. The field magnets therefore would be wound with a shunt wire and also in series, the shunt wire being part of the normal resistance circuit, and the series wire being in the circuit from the main line wire to the armature of the dynamo-electric machine. When the current through the series wire flows in the same direction as that of the shunt wire the strength of the magnet will be determined by the sum of both currents, while if they are in opposite directions the magnetism will be weakened down to the difference between the two currents.

My invention depends upon the fact already mentioned that the greater current is carried by the armature of the motor than of the dynamo and consists in placing the series wires of each field magnet, not in the circuit of its own armature but in circuit with the armature of the other dynamo-electric machine. By this cross-wise arrangement of circuits I utilize the stronger current of the motor armature circuit in controlling the dynamo field instead of the weaker current of its own armature circuit,—and the weaker current of the dynamo acts upon the motor field.

My invention therefore consists in an apparatus for controlling electric motors, which is composed of two dynamo-electric machines with one moving element of each machine mechanically joined with a moving element of the other machine, and with the field magnet of each machine wired in series with the armature of the other machine.

In the accompanying drawing I have shown my apparatus only diagrammatically, as the details of such apparatus in general are well known.

A, is the armature of that one of the two dynamo electric machines which has a rotary field and may be called for distinction, the motor armature. B, is the armature of the other dynamo-electric machine, having a stationary field, and may be called the dynamo armature. These two armatures are mounted upon the shaft C and turn in unison.

F, is the rotary field magnet for armature A.

O, is the stationary field magnet for armature B.

The field magnet F is mounted on the load shaft D which turns the load E.

T, is the resistance.

Power is drawn from the main feed wire H, through the wire J and is divided according to circumstances as follows: The lever of the rheostat is connected directly to one of the main line wires by the wire V, and the two extreme points of the resistance are respectively connected to the shunt fields of the two motors by the wires W and Y; the other terminals of these fields being connected directly, or indirectly, to the other main line wire. When the armature A is to act as a motor the current from line J passes through the series wire of magnet O, shown in heavy lines, thence by wire S to armature A from which it emerges through S' and reaches the main return wire G through the wire K. When the armature B is to act as a motor, the current from wire J passes first through the armature B by means of the wire R then by the wire R' to the series coil of magnet F thence through the wire S' to the main return wire G. When the armature A is to act as a generator it supplies current to assist the main line at the junctions of the line S' and the series coil of the dynamo electric machine A; and of the line R and the series coil of the dynamo electric machine B. The current traverses the lines S, and S' and the series coil of B in a direction opposite to the arrow. When the armature B is to act as a generator a reversal of current takes place between the same points as above mentioned, but not over the same wires. In this case the wires R, R', and the series coil of A are reversed. The resulting effect is that a load on the system always has a greater governing effect on the dynamo than on the motor which is preferable, and is due to the loss of torque arising from a weakened field.

When the arm of the rheostat T is at the position shown in the drawing the resistance is evenly divided between the two field magnets. When the arm is moved to the right or to the left it cuts the resistance into one circuit and cuts it out of the other circuit. This results in weakening one field and strengthening the other. If now the current passes through the series wires of the magnet which has been strengthened, in the same direction as the magnet current, said magnet will be further strengthened. At the same time a current passing through the series wires of the magnet which has been weakened but in an opposite direction to the magnet currents will still further weaken the field; the weakening effect of the latter, however, being very slight compared with the strengthening effects of the former due to the difference in the relative currents. These changes take place automatically according to well-known laws, and it will be therefore readily seen that this cross-wise system of making the current from one armature pass through the field of the other armature instead of that of its own machine produces valuable results not produced where the current from the armature passes through its own field. One of the most important of these results is that the governing of the apparatus takes place mainly at the dynamo end, instead of at the motor end as heretofore. The reason for this preference is due to the decrease in torque of the motor when its field is weakened for the purpose of increasing its speed which largely neutralizes the desired effect, while on the dynamo, and the result is exactly the reverse. If it was possible to do the governing entirely on the dynamo end, without too much complication we would be glad to do so. With my invention however, the dynamo obtains the governing effect from the combined dynamo and line currents, while the motor is governed only by the amount of the dynamo current, so I think that I have reached as nearly the desired end as is possible without a complication of automatic circuit shifters.

I claim:

An apparatus for controlling electric motors which is composed of two dynamo-electric machines with one moving element of each machine mechanically joined with a moving element of the other machine and with the series wire of the field magnet of each machine placed in the circuit of the armature of the other machine instead of in the circuit of its own armature.

HARRY E. DEY.

Witnesses:
 DOROTHY STANDISH,
 W. P. PREBLE, Jr.